(12) United States Patent
Budacz

(10) Patent No.: US 7,304,809 B1
(45) Date of Patent: Dec. 4, 2007

(54) MAGNIFICATION SCREEN FOR BOOKS, MAGAZINES AND LIKE BOUND LITERARY WORKS

(76) Inventor: Geraldine Budacz, 815 Morris Ave., Lutherville, MD (US) 21093

( * ) Notice: Subject to any disclaimer, the term of this patent is extended or adjusted under 35 U.S.C. 154(b) by 0 days.

(21) Appl. No.: 11/589,501

(22) Filed: Oct. 31, 2006

Related U.S. Application Data

(60) Provisional application No. 60/781,163, filed on Mar. 13, 2006.

(51) Int. Cl.
*G02B 27/02* (2006.01)
(52) U.S. Cl. .................................. 359/802; 359/809
(58) Field of Classification Search ............. 359/802, 359/803, 804, 809, 810
See application file for complete search history.

(56) References Cited

U.S. PATENT DOCUMENTS

| | | |
|---|---|---|
| 4,496,127 A | 1/1985 | Nelson |
| 4,770,635 A | 9/1988 | Gabay |
| 6,574,051 B1 | 6/2003 | Powell |

*Primary Examiner*—Timothy Thompson

(57) ABSTRACT

A magnifying screen includes a frame with a length to width ratio that is smaller than that of a page and has a hollow opening covering a major portion of a surface thereof. A tassel is coupled to a top ledge of the frame and protrudes beyond a top edge of the literary article. An optical implement is attached to the frame and is adjoined along the page. A sleeve in is communication with the frame and is positioned along a longitudinal length of the frame. The sleeve has top and bottom surfaces provided with an opening traversing across a longitudinal axis thereof. The openings have a longitudinal length extending along the entire width of the frame. A locking mechanism and an illuminating mechanism are included. The illuminating mechanism is coupled to the frame and travels along a perimeter of the openings.

18 Claims, 6 Drawing Sheets

MAGNIFICATION SCREEN FOR BOOKS, MAGAZINES AND LIKE BOUND LITERARY WORKS

CROSS REFERENCE TO RELATED APPLICATIONS

This application claims the benefit of U.S. Provisional Application No. 60/781,163, filed Mar. 13, 2006.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to magnification devices and, more particularly, to a magnification screen for books, magazines and like bound literary works for assisting a user to read text on a page of a bound literary article.

2. Prior Art

Those with impaired vision often rely on portable magnifiers to aid in our viewing duties. While these magnifiers certainly work, they require the user to hold them at a certain distance above the viewed item. Of course, if this is done for an extended period of time, such while reading a book or a newspaper, one's hands and arms will quickly tire. Also, if the user is using their hands to perform other tasks while viewing, such as typing or writing, the situation quickly becomes awkward and clumsy. These problems are not only limited to those with impaired vision, but to anyone who may use a portable magnifier at one time or another such as those viewing photographs with small levels of detail, those working on circuit boards with very small components, or anyone who works with items at a very small detail.

One prior art example shows magnifying system to aid in the viewing or reading of a book, papers or similar documents by those with impaired vision. A magnifying lens with approximate overall dimensions of eight by eleven inches is supported in an attractive wood or plastic frame of various designs and is supported by a series of four legs in each corner. The legs are adjustable in length by the use of a spring-based telescopic adjustment system that allows the user to adjust for different parameters such as strength of magnification, object size, level of vision impairment and the like. The legs also fold over against the frame in a manner similar to a card table to allow the invention to be carried in a case, a briefcase or just allow for easier transportation with reduced risk of damage. Unfortunately, this prior art example is only available in one size. In addition, this prior art example is large and bulky making it difficult to store and transport.

Another prior art example shows an adjustable book holder for supporting a book or the like in an opened position. The example includes a front member having a horizontal base portion and a transparent support panel extending upwardly and rearwardly from the front end of the horizontal base portion. The book holder also includes a rear member having a horizontal base portion and a support panel extending upwardly and rearwardly from the front end of the base portion of the rear member. The lower surface of the base portion of the rear member includes a toothed rack which releasably engages a mating toothed rack provided by the upper surface of the base portion of the front member for positioning the support panel of the rear member generally parallel to the support panel of the front member and spaced apart therefrom by a distance that is adjustable to account for books of different thicknesses. The transparent support panel of the front member is preferably formed as a magnifying lens to enlarge the printed matter appearing upon the exposed pages of the book. Unfortunately, this prior art example does not allow for placing the reading material flat horizontally or upon a user knees for example. This prior art example also does not fold flat for ease of storage and transport.

Accordingly, a need remains for a magnification screen for books, magazines and like bound literary works. The present invention satisfies such a need by providing an apparatus that is simple and easy to use, is lightweight yet durable in design, and is easily secured to the pages of a book, magazine, or other reading material. Such an apparatus provides an easy means of reading fine print and, is perfect for use with legal documents, graphs, computer printouts, school texts, newspapers, magazines and books. The apparatus is inexpensive, convenient and easy to store and transport.

BRIEF SUMMARY OF THE INVENTION

In view of the foregoing background, it is therefore an object of the present invention to provide an apparatus for a magnification screen for books, magazines and like bound literary works. These and other objects, features, and advantages of the invention are provided by a magnifying screen for assisting a user to read text on a page of a bound literary article.

The apparatus includes a frame contiguously seated on top of the page and that is freely slidable therealong. Such a frame conveniently has a length to width ratio that is smaller than a length to width ratio of the page such that the frame is advantageously hidden within a perimeter of the page when the literary article is adapted to a closed position. The frame has a hollow opening effectively covering a major portion of a surface area of the frame. A tassel is directly coupled to a top ledge of the frame and advantageously protrudes beyond a top edge of the literary article such that the page is quickly identified during non-reading conditions.

The apparatus further includes an optical implement permanently attached directly to the frame. Such an optical implement is removably and contiguously adjoined along the page such that text from the page is effectively enlarged by a predetermined magnitude for conveniently assisting the user during reading conditions.

The apparatus further includes a sleeve in direct communication with the frame and situated thereabout. Such a sleeve is telescopically positioned along a longitudinal length of the frame in such a manner that the frame is effectively intercalated within the sleeve during reading conditions. The sleeve is provided with top and bottom shoulders monolithically formed therewith. Such top and bottom shoulders extend inwardly towards top and bottom surfaces of the optical implement and maintain continuous contact therewith. The sleeve has top and bottom surfaces conveniently provided with an opening traversing across a longitudinal axis thereof. Such top and bottom openings have a longitudinal length advantageously extending along the entire width of the frame so that the user can effectively read an entire line of text on the page of the literary article.

The top and bottom openings of the sleeve are vertically aligned for defining a continuous line of sight through the optical element.

The sleeve is preferably formed from flexible material and advantageously bows outwardly away from the frame in such a manner that a gap is effectively formed above and below the frame to thereby permit the frame to be slidably positioned within the sleeve while the detent (herein described below) is disengaged from the aperture. A combined thickness of the sleeve and the frame is substantially equal to a thickness of the page such that all pages of the literary article effectively lay contiguously together when the literary article is adapted to the closed position. This combined thickness allows a literary article to be closed and stored as usual without detrimental effect from the addition of the apparatus.

The apparatus further includes a mechanism for releasably locking the frame to the sleeve such that the frame conveniently maintains a static spatial relationship with the sleeve during reading conditions. Such a releasably locking mechanism includes a detent including a deformably resilient spring member positioned within a bottom section of the frame. Such a spring member is repeatedly compressible along a linear path defined orthogonal to the longitudinal length of the frame. A stop block is directly and statically coupled to a top end of the spring member. Such a stop block effectively penetrates through the aperture of the sleeve and thereby advantageously prevents the frame from sliding along the sleeve during reading conditions.

The apparatus further includes a mechanism for illuminating a perimeter of the optical implement. Such an illuminating mechanism is directly coupled to the frame and travels along a perimeter of the opening. Such an illuminating mechanism includes a power supply source, and a switch electrically coupled to the power supply source and the detent respectively. Such a switch is manually controlled by the detent. A unitary and continuous fiber optic cable effectively extends along the perimeter of the opening and is conveniently spaced inwardly from an outer perimeter of the frame. Such an optical cable is directly abutted against the optical implement and maintains continuous contact with an outer perimeter of the optical implement during reading conditions.

The releasably locking mechanism and the illuminating mechanism are independently and simultaneously operable. The independent and simultaneous operation of the releasably locking mechanism and the illuminating mechanism provide the unexpected benefit of allowing a user to adjust the frame while maintaining illumination during operating conditions, thereby overcoming prior art shortcomings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
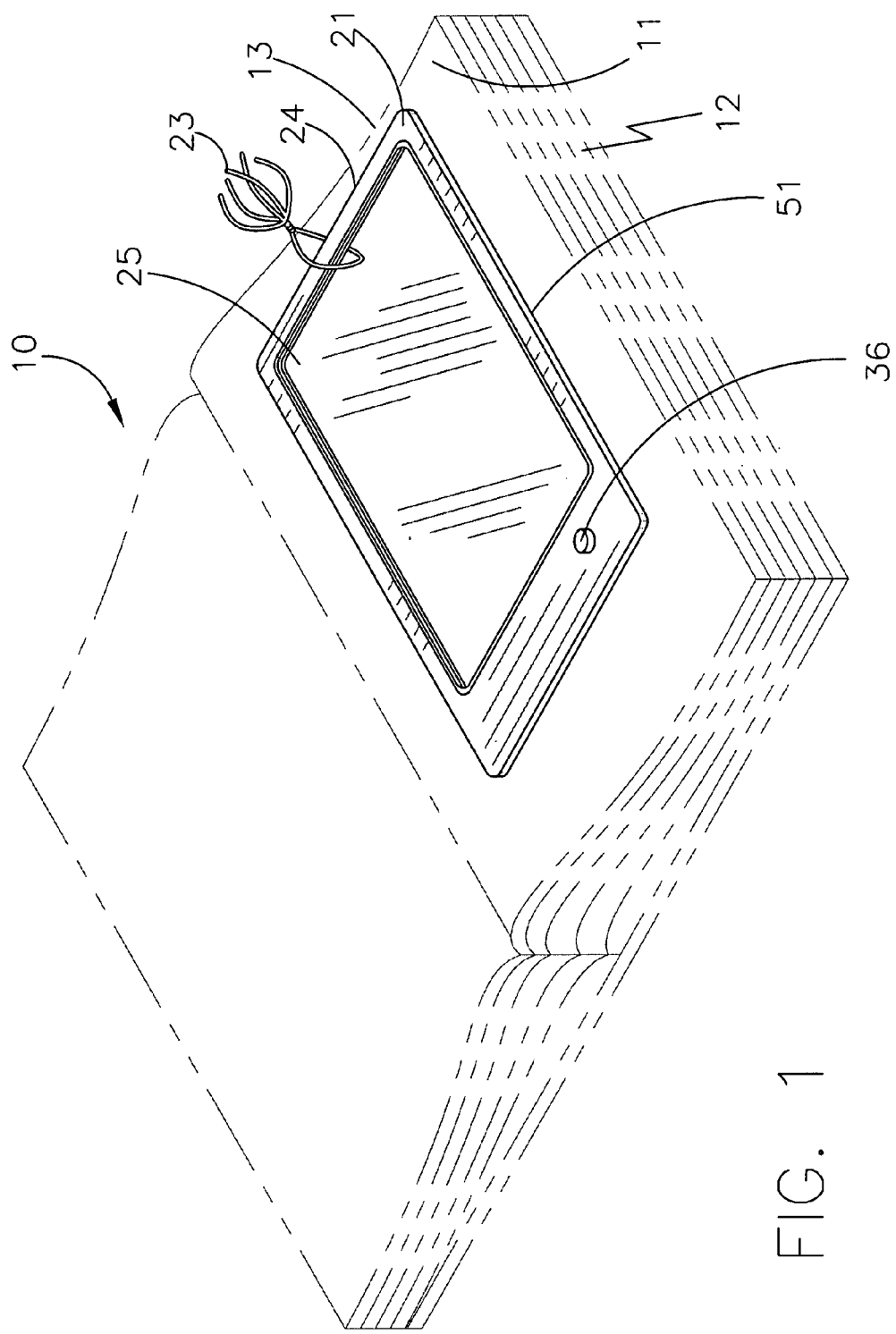
FIG. 1 is a perspective view showing a magnification screen for books, magazines and like bound literary works attached to a literary work, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6 by the reference numeral 10 and is intended to provide a magnification screen for books, magazines and like bound literary works. It should be understood that the apparatus 10 may be used to magnify many different types of printed materials and should not be limited in use to magnifying only those types of printed materials described herein.

Referring initially to FIGS. 1, 2, 3, 4 and 5, the apparatus 10 includes a frame 21 contiguously seated on top of the page 11 and that is freely slidable therealong. Such a frame 21 conveniently has a length to width ratio that is smaller than a length to width ratio of the page 11, which is essential such that the frame 21 is advantageously hidden within a perimeter of the page 11 when the literary article 12 is adapted to a closed position. Of course, such a frame 21 can be produced in a variety of shapes and sizes, as is obvious to a person of ordinary skill in the art, so long as the frame fits within a perimeter of each page of the printed material. The frame 21 has a hollow opening 22 covering a major portion of a surface area of the frame 21. A tassel 23 is directly coupled to a top ledge 24 of the frame 21, without the use of intervening elements, and advantageously protrudes beyond a top edge 13 of the literary article 12, which is vital such that the page 11 is quickly identified during non-reading conditions. Of course, such a tassel 23 can be produced in a variety of sizes and from a variety of suitable materials, as is obvious to a person of ordinary skill in the art.

Figure 2:
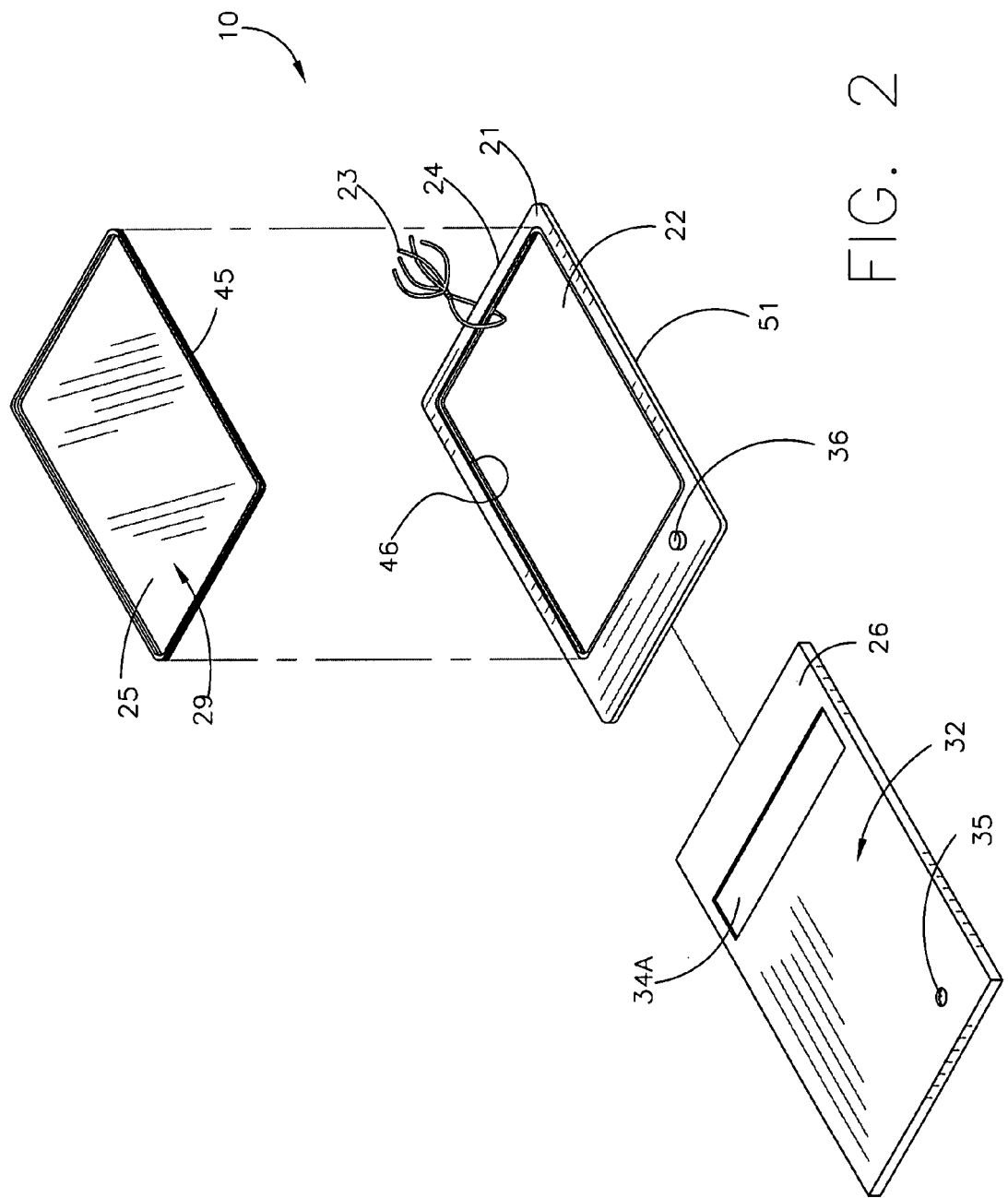
FIG. 2 is a perspective view of the sleeve, the frame, the tassel and the optical implement respectively in a detached position.
Figure 3:
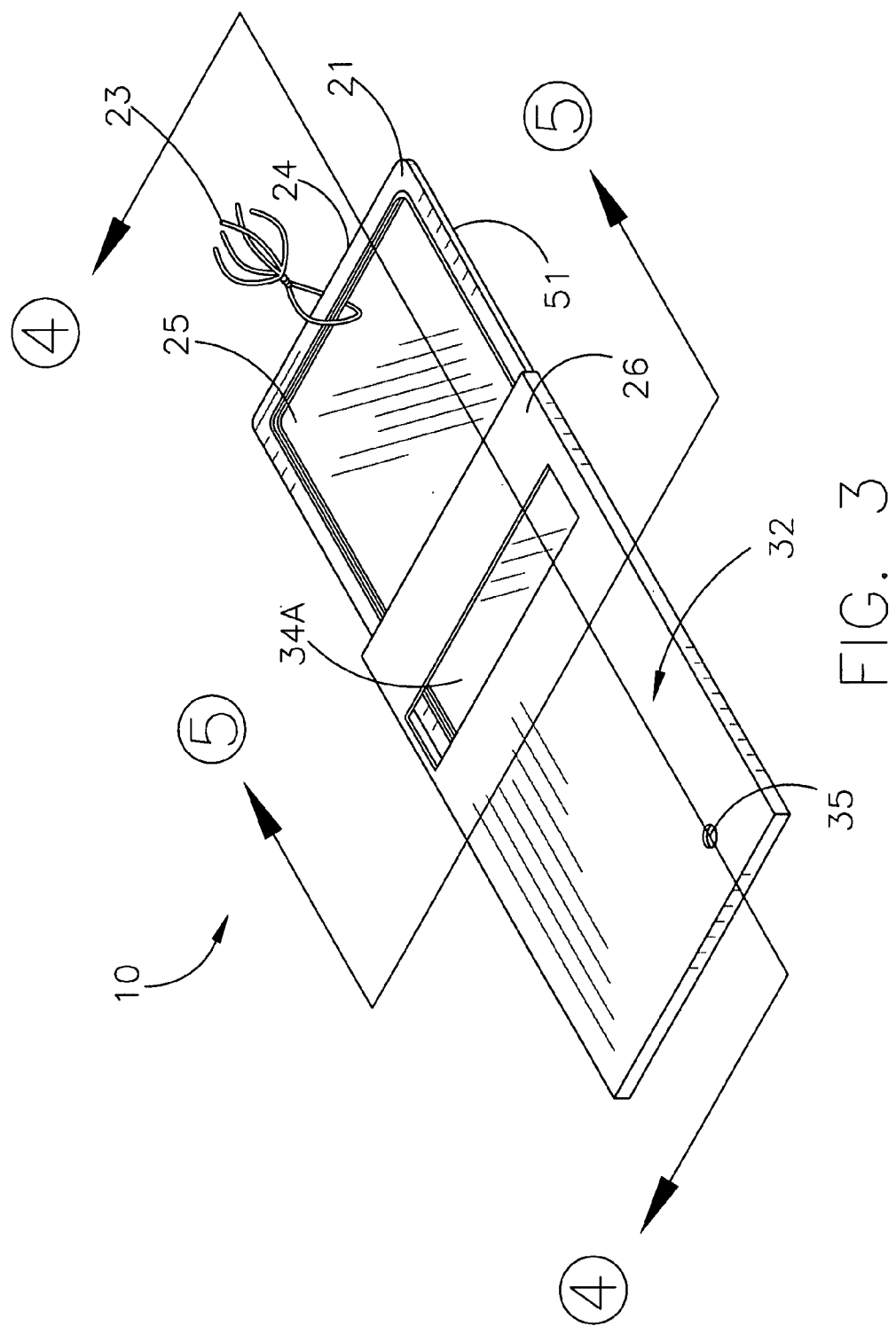
FIG. 3 is a perspective view of the sleeve, the frame, the tassel and the optical element respectively in an attached position.

Referring to FIGS. 1, 2 and 3, the apparatus 10 further includes an optical implement 25 permanently attached directly to the frame 21, without the use of intervening elements. Such an optical implement 25 is removably and contiguously adjoined along the page 11, which is critical such that text from the page 11 is advantageously enlarged by a predetermined magnitude for assisting the user during reading conditions. Of course, such an optical implement 25 can be formed from a variety of suitable magnifying materials, as is obvious to a person of ordinary skill in the art.

Referring to FIGS. 1, 2, 3 and 4, the apparatus 10 further includes a sleeve 26 in direct communication with the frame 21, without the use of intervening elements, and situated thereabout. Such a sleeve 26 is telescopically positioned along a longitudinal length of the frame 21 in such a manner that the frame 21 is intercalated within the sleeve 26 during reading conditions. The sleeve 26 is provided with top 27 and bottom 28 shoulders monolithically formed therewith. Such top and bottom shoulders 27, 28 extend inwardly towards top 29 and bottom surfaces of the optical implement 25, which is crucial for and maintaining continuous contact therewith.

Figure 4:
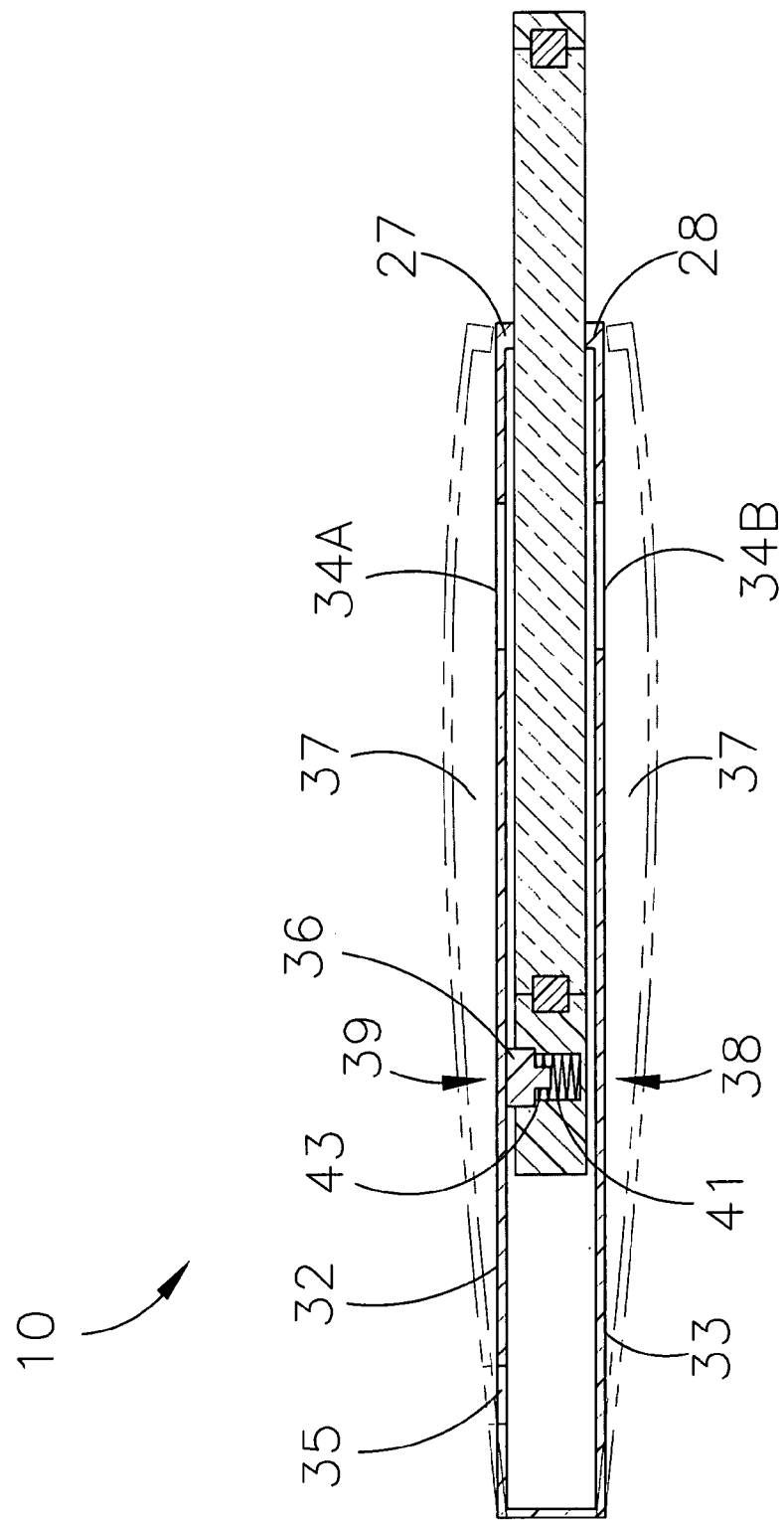
FIG. 4 is a cross sectional view of the apparatus shown in FIG. 3, taken along line 4-4.
Figure 5:
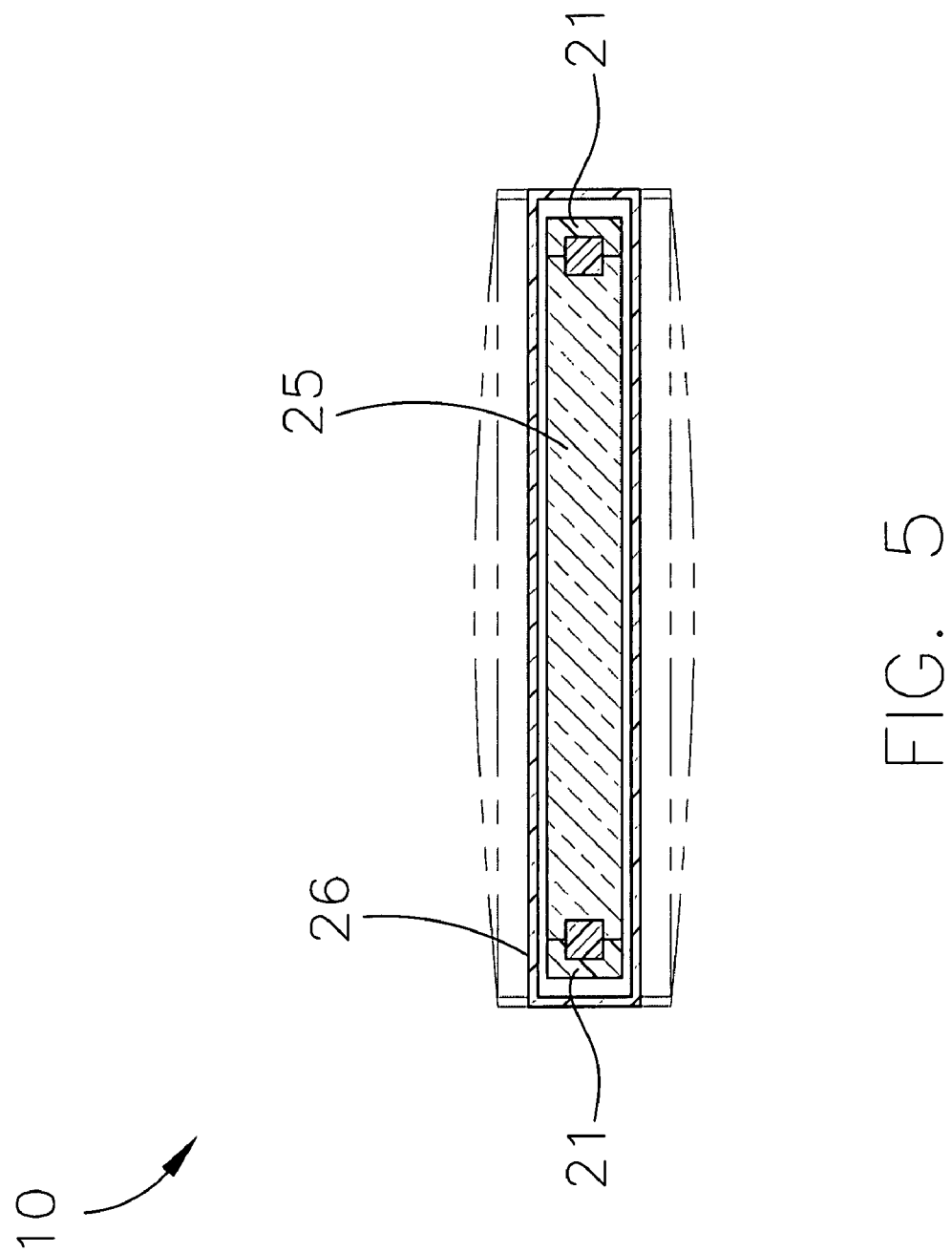
FIG. 5 is cross sectional view of the apparatus shown in FIG. 3, taken along line 5-5.

Referring to FIGS. 2, 3 and 4, the sleeve 26 further has top 32 and bottom 33 surfaces provided with an opening 34 traversing across a longitudinal axis thereof. Such top and bottom openings 34A, 34B have a longitudinal length advantageously extending along the entire width of the frame 21, which is important so that the user can read an entire line of text on the page 11 of the literary article 12. The top and bottom openings 34A, 34B of the sleeve 26 are vertically aligned for defining a continuous line of sight through the optical element 25. An aperture 35 is formed in the top surface 32 of the sleeve 26 and is advantageously positioned in such a manner that the stop block 36 (herein described below) penetrates through the aperture 35 during operating conditions.

Referring to FIG. 3, the sleeve 26 is preferably formed from flexible material and advantageously bows outwardly away from the frame 21, which is essential such that a gap 37 is formed above and below the frame 21 to thereby permit the frame 21 to be slidably positioned within the sleeve 26 while the stop block 36 is disengaged from the aperture 35. Of course, such a sleeve 26 can be formed from a variety of suitably flexible materials, as is obvious to a person of ordinary skill in the art. A combined thickness of the sleeve 26 and the frame 25 is substantially equal to a thickness of the page 11, which is vital such that all pages 11 of the literary article lay contiguously together when the literary article 12 is adapted to the closed position. This combined thickness allows a literary article 12 to be closed and stored as usual without detrimental effect from the addition of the apparatus 10, thus providing an unexpected benefit and thereby overcoming prior art shortcomings.

Figure 6:
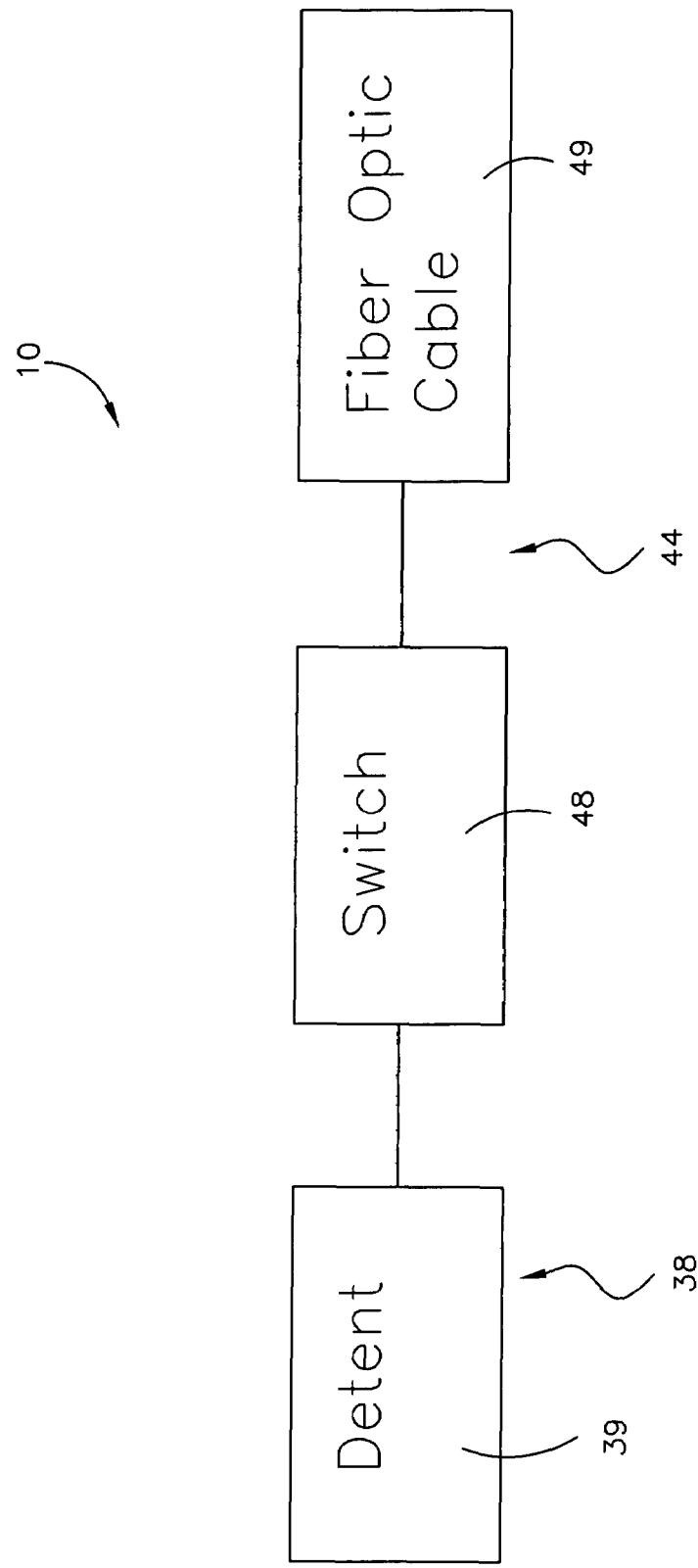
FIG. 6 is a schematic block diagram showing the electrically connection between the switch, detent and fiber optic cable.

Referring to FIGS. 4 and 6, the apparatus 10 further includes a mechanism 38 for releasably locking the frame 21 to the sleeve 26, which is critical such that the frame 21 maintains a static spatial relationship with the sleeve 26 during reading conditions. Such a releasably locking mechanism 38 includes a detent 39 including a deforrably resilient spring member 41 positioned within a bottom section of the frame 21. Such a spring member 41 is repeatedly compressible along a linear path defined orthogonal to the longitudinal length of the frame 21. A stop block 36 is directly and statically coupled to a top end 43 of the spring member 41, without the use of intervening elements. Such a stop block 36 necessarily penetrates through the aperture 35 of the sleeve 26 and thereby advantageously prevents the frame 21 from sliding along the sleeve 26 during reading conditions.

Referring to FIGS. 2 and 6, the apparatus 10 further includes a mechanism 44 for illuminating a perimeter 45 of the optical implement 25. Such an illuminating mechanism 44 is directly coupled to the frame 21, without the use of intervening elements, and travels along a perimeter 46 of the opening 22. Such an illuminating mechanism 44 includes a power supply source, and a switch 48 electrically coupled to the power supply source and the detent 39 respectively. Such a switch 48 is manually controlled by the detent 39. A unitary and continuous fiber optic cable 49 extends along the perimeter 46 of the opening 22 and is spaced inwardly from an outer perimeter 51 of the frame 21. Such an optical cable 49 is directly abutted against the optical implement 25, without the use of intervening elements, and advantageously maintains continuous contact with an outer perimeter 45 of the optical implement 25 during reading conditions.

The releasably locking mechanism 38 and the illuminating mechanism 44 are independently and simultaneously operable. The independent and simultaneous operation of the releasably locking mechanism 38 and the illuminating mechanism 44 provide the unexpected benefit of allowing a user to adjust the frame 21 while maintaining illumination of the page 11 during operating conditions, thereby overcoming prior art shortcomings.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A magnifying screen for assisting a user to read text on a page of a bound literary article, said magnifying screen comprising:

a frame contiguously seated on top of the page and being freely slidable therealong said frame having a length to width ratio that is smaller than a length to width ratio of the page such that said frame is hidden within a perimeter of the page when the literary article is adapted to a closed position, said frame having a hollow opening covering a major portion of a surface area of said frame;

an optical implement permanently attached directly to said frame, said optical Implement being removably and contiguously adjoined along the page such that text from the page is enlarged by a predetermined magnitude for assisting the user during reading conditions;

a sleeve in direct communication with said frame and situated thereabout, said sleeve being telescopically positioned along a longitudinal length of said frame in such a manner that said frame is intercalated within said sleeve during reading conditions, said sleeve having top and bottom surfaces provided with an opening traversing across a longitudinal axis thereof, said top and bottom openings having a longitudinal length extending along the entire width of said frame so that the user can read an entire line of text on the page of the literary article, wherein a combined thickness of said sleeve and said frame is substantially equal to a thickness of the page such that all pages of the literary article lay contiguously together when the literary article is adapted to the closed position;

means for releasably locking said frame to said sleeve such that said frame maintains a static spatial relationship with said sleeve during reading conditions; and means for illuminating a perimeter of said optical implement, said illuminating means being directly coupled to said frame and traveling along a perimeter of said opening.

2. The magnifying screen of claim 1, wherein said releasably locking means comprises: a detent including a deformably resilient spring member positioned within a bottom section of said frame, said spring member being repeatedly compressible along a linear path defined orthogonal to the longitudinal length of said frame; and a stop block directly and statically coupled to a top end of said spring member, said stop block penetrating through said aperture of said sleeve and thereby preventing said frame from sliding along said sleeve during reading conditions.

3. The magnifying screen of claim 1, wherein said sleeve is formed from flexible material and bows outwardly away from said frame in such a manner that a gap is formed above and below said frame to thereby permit said frame to be slidably positioned within said sleeve while said detent is disengaged from said aperture.

4. The magnifying screen of claim 1, wherein said sleeve is provided with top and bottom shoulders monolithically formed therewith, said top and bottom shoulders extending inwardly towards top and bottom surfaces of said optical implement and maintaining continuous contact therewith.

5. The magnifying screen of claim 1, wherein said top and bottom openings of said sleeve are vertically aligned for defining a continuous line of sight through said optical element.

6. The magnifying screen of claim 1, wherein said illuminating means comprises;

a power supply source;

a switch electrically coupled to said power supply source and said detent, said switch be manually controlled by said detent; and a unitary and continuous fiber optic cable extending along said perimeter of said opening and spaced inwardly from an outer perimeter of said frame, said optical cable being directly abutted against said optical implement and maintaining continuous contact with an outer perimeter of said optical implement during reading conditions.

7. A magnifying screen for assisting a user to read text on a page of a bound literary article, said magnifying screen comprising:

a frame contiguously seated on top of the page and being freely slidable therealong said frame having a length to width ratio that is smaller than a length to width ratio of the page such that said frame is hidden within a perimeter of the page when the literary article is adapted to a closed position, said frame having a hollow opening covering a major portion of a surface area of said frame;

an optical implement permanently attached directly to said frame, said optical implement being removably and contiguously adjoined along the page such that text from the page is enlarged by a predetermined magnitude for assisting the user during reading conditions;

a sleeve in direct communication with said frame and situated thereabout, said sleeve being telescopically positioned along a longitudinal length of said frame in such a manner that said frame is intercalated within said sleeve during reading conditions, said sleeve having top and bottom surfaces provided with an opening traversing across a longitudinal axis thereof, said top and bottom openings having a longitudinal length extending along the entire width of said frame so that the user can read an entire line of text on the page of the literary article, wherein a combined thickness of said sleeve and said frame is substantially equal to a thickness of the page such that all pages of the literary article lay contiguously together when the literary article is adapted to the closed position;

a tassel directly coupled to a top ledge of said frame and protruding beyond a top edge of the literary article such that the page is quickly identified during non-reading conditions;

means for releasably locking said frame to said sleeve such that said frame maintains a static spatial relationship with said sleeve during reading conditions; and means for illuminating a perimeter of said optical implement, said illuminating means being directly coupled to said frame and traveling along a perimeter of said opening.

8. The magnifying screen of claim 7, wherein said releasably locking means comprises: a dent including a deformably resilient spring member positioned within a bottom section of said frame, said spring member being repeatedly compressible along a linear path defined orthogonal to the longitudinal length of said frame; and a stop block directly and statically coupled to a top end of said spring member, said stop block penetrating through said aperture of said sleeve and thereby preventing said frame from sliding along said sleeve during reading conditions.

9. The magnifying screen of claim 7, wherein said sleeve is formed from flexible material and bows outwardly away from said frame in such a manner that a gap is formed above and below said frame to thereby permit said frame to be slidably positioned within said sleeve while said detent is disengaged from said aperture.

10. The magnifying screen of claim 7, wherein said sleeve is provided with top and bottom shoulders monolithically formed therewith, said top and bottom shoulders extending inwardly towards top and bottom surfaces of said optical implement and maintaining continuous contact therewith.

11. The magnifying screen of claim 7, wherein said top and bottom openings of said sleeve are vertically aligned for defining a continuous line of sight through said optical element.

12. The magnifying screen of claim 7, wherein said illuminating means comprises:

a power supply source;

a switch electrically coupled to said power supply source and said detent, said switch be manually controlled by said detent; and a unitary and continuous fiber optic cable extending along said perimeter of said opening and spaced inwardly from an outer perimeter of said frame, said optical cable being directly abutted against said optical implement and maintaining continuous contact with an outer perimeter of said optical implement during reading conditions.

13. A magnifying screen for assisting a user to read text on a page of a bound literary article, said magnifying screen comprising:
  a frame contiguously seated on top of the page and being freely slidable therealong said frame having a length to width ratio that is smaller than a length to width ratio of the page such that said frame is hidden within a perimeter of the page when the literary article is adapted to a closed position, said frame having a hollow opening covering a major portion of a surface area of said frame;
  an optical implement permanently attached directly to said frame, said optical implement being removably and contiguously adjoined along the page such that text from the page is enlarged by a predetermined magnitude for assisting the user during reading conditions;
  a sleeve in direct communication with said frame and situated thereabout, said sleeve being telescopically positioned along a longitudinal length of said frame in such a manner that said frame is intercalated within said sleeve during reading conditions, said sleeve having top and bottom surfaces provided with an opening traversing across a longitudinal axis thereof, said top and bottom openings having a longitudinal length extending along the entire width of said frame so that the user can read an entire line of text on the page of the literary article, wherein a combined thickness of said sleeve and said frame is substantially equal to a thickness of the page such that all pages of the literary article lay contiguously together when the literary article is adapted to the closed position;
  a tassel directly coupled to a top ledge of said frame and protruding beyond a top edge of the literary article such that the page is quickly identified during non-reading conditions;
  means for releasably locking said frame to said sleeve such that said frame maintains a static spatial relationship with said sleeve during reading conditions; and
  means for illuminating a perimeter of said optical implement, said illuminating means being directly coupled to said frame and traveling along a perimeter of said opening, wherein said illuminating means and said releasably locking means are independently and simultaneously operable.

14. The magnifying screen of claim 13, wherein said releasably locking means comprises: a detent including
  a deformably resilient spring member positioned within a bottom section of said frame, said spring member being repeatedly compressible along a linear path defined orthogonal to the longitudinal length of said frame; and
  a stop block directly and statically coupled to a top end of said spring member, said stop block penetrating through said aperture of said sleeve and thereby preventing said frame from sliding along said sleeve during reading conditions.

15. The magnifying screen of claim 13, wherein said sleeve is formed from flexible material and bows outwardly away from said frame in such a manner that a gap is formed above and below said frame to thereby permit said frame to be slidably positioned within said sleeve while said detent is disengaged from said aperture.

16. The magnifying screen of claim 13, wherein said sleeve is provided with top and bottom shoulders monolithically formed therewith, said top and bottom shoulders extending inwardly towards top and bottom surfaces of said optical implement and maintaining continuous contact therewith.

17. The magnifying screen of claim 13, wherein said top and bottom openings of said sleeve are vertically aligned for defining a continuous line of sight through said optical element.

18. The magnifying screen of claim 13, wherein said illuminating means comprises:
  a power supply source;
  a switch electrically coupled to said power supply source and said detent, said switch be manually controlled by said detent; and
  a unitary and continuous fiber optic cable extending along said perimeter of said opening and spaced inwardly from an outer perimeter of said frame, said optical cable being directly abutted against said optical implement and maintaining continuous contact with an outer perimeter of said optical implement during reading conditions.

* * * * *